(12) United States Patent
Suhre

(10) Patent No.: US 11,077,948 B2
(45) Date of Patent: Aug. 3, 2021

(54) ROTARY BACKREST RECLINE MECHANISM

(71) Applicant: B/E Aerospace, Inc., Winston-Salem, NC (US)

(72) Inventor: Ryan J. Suhre, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 258 days.

(21) Appl. No.: 16/380,333

(22) Filed: Apr. 10, 2019

(65) Prior Publication Data
US 2020/0324904 A1 Oct. 15, 2020

(51) Int. Cl.
*B60N 2/16* (2006.01)
*B64D 11/06* (2006.01)
(Continued)

(52) U.S. Cl.
CPC .............. *B64D 11/064* (2014.12); *B60N 2/20* (2013.01); *B60N 2/224* (2013.01); *B60N 2/767* (2018.02); *B60N 2/943* (2018.02); *B60N 3/001* (2013.01); *B64D 11/0638* (2014.12); *B60N 2/167* (2013.01); *B60N 2/168* (2013.01); *B60N 2/2257* (2013.01); *B60N 2/841* (2018.02); *F16D 41/067* (2013.01); *F16D 41/088* (2013.01)

(58) Field of Classification Search
CPC ........ B60N 2/943; B60N 2/224; B60N 2/167; B60N 2/168; B60N 2/2257; B60N 3/001; B64D 11/064; F16D 41/067; F16D 41/088
See application file for complete search history.

(56) References Cited

U.S. PATENT DOCUMENTS 4,431,231 A 2/1984 Elazari et al.
5,873,630 A 2/1999 Yoshida et al.
(Continued)

FOREIGN PATENT DOCUMENTS

EP 1398270 A1 3/2004
EP 2897491 A1 7/2015
(Continued)

OTHER PUBLICATIONS

EP Search Report dated Jun. 23, 2020 for European Patent Application No. 19212771.0.

*Primary Examiner* — Syed A Islam
(74) *Attorney, Agent, or Firm* — Suiter Swantz pc llo

(57) ABSTRACT

A backrest recline mechanism including a first shaft attachable to a first seat assembly component and a second shaft attachable to a second seat assembly component. The first shaft has a slotted ring defining capture slots and an interior annular space. A control ring has a first end disposed in the annular space. The second shaft is engaged with a second end of the control ring. A first collar, having a plurality of release recesses, is rotatably disposed around the slotted ring. First bearings respectively retained within the capture slots are beneath the first collar. In a first rotational position of the first collar, the plurality of release recesses align with the capture slots to rotationally disengage the first and second components. In a second rotational position, the release recesses misalign with the capture slots to rotationally engage the first and second seat assembly components.

20 Claims, 13 Drawing Sheets

(51) Int. Cl.
   *B60N 2/75* (2018.01)
   *B60N 2/90* (2018.01)
   *B60N 3/00* (2006.01)
   *B60N 2/22* (2006.01)
   *B60N 2/20* (2006.01)
   *B60N 2/841* (2018.01)
   *B60N 2/225* (2006.01)
   *F16D 41/08* (2006.01)
   *F16D 41/067* (2006.01)

(56) References Cited

U.S. PATENT DOCUMENTS

| | | | |
|---|---|---|---|
| 6,092,874 A | 7/2000 | Kojima et al. | |
| 6,336,679 B1 | 1/2002 | Smuk | |
| 6,343,808 B1 | 2/2002 | Luh | |
| 6,481,557 B2* | 11/2002 | Denis | B60N 2/167 |
| | | | 192/15 |
| 6,626,495 B2 | 9/2003 | Okazaki et al. | |
| 7,114,778 B2* | 10/2006 | Schuler | B60N 2/1615 |
| | | | 297/367 R |
| 7,188,905 B2 | 3/2007 | Ham | |
| 8,348,344 B2* | 1/2013 | Richard | B60N 2/167 |
| | | | 297/344.12 |
| 8,424,665 B2* | 4/2013 | Kawai | B60N 2/1615 |
| | | | 192/223.2 |
| 8,602,497 B2 | 12/2013 | Zhang et al. | |
| 8,985,296 B2* | 3/2015 | Kawai | B60N 2/1615 |
| | | | 192/223.2 |
| 9,987,952 B2* | 6/2018 | Chae | B60N 2/167 |
| 10,369,912 B2* | 8/2019 | Asai | B60N 2/1615 |
| 10,442,321 B2* | 10/2019 | Mikasa | F16D 41/105 |
| 10,611,285 B2* | 4/2020 | Kuhlmann | B60N 2/1685 |
| 10,682,929 B2* | 6/2020 | Costantino | B60N 2/233 |
| 10,711,851 B2* | 7/2020 | Sato | F16D 41/067 |
| 2013/0249257 A1 | 9/2013 | Suhre et al. | |
| 2018/0345826 A1* | 12/2018 | Mikasa | F16D 41/066 |
| 2018/0346125 A1 | 12/2018 | Thompson et al. | |

FOREIGN PATENT DOCUMENTS

| | | |
|---|---|---|
| FR | 2910088 A1 | 6/2008 |
| WO | 2014047259 A1 | 3/2014 |

\* cited by examiner

ROTARY BACKREST RECLINE MECHANISM

BACKGROUND

Vehicle seats such as aircraft passenger seats are commonly equipped with backrests that pivot from upright to reclined positions. A backrest is usually pivotally-mounted between seat-assembly frame members fixed to the floor of an aircraft. The recline angle of a backrest can typically be controlled for the comfort, convenience, and safety of an occupant passenger as well as passengers entering and exiting their seats in a rearwardly adjacent row of seats. Space is limited in a commercial aircraft. For economic feasibility, the space between rows of seats, and the normal range of movement of a backrest, are accordingly limited. The degree of rearward recline movement is constrained by the position of the rearward row of seats and the requirement to leave an aft-seated passenger with sufficient room to enter and exit his or her own seat as well as use a meal tray. The degree of forward movement of a backrest is typically limited to a position where the backrest is in a full upright position for take-off, taxi, and landing (TTOL) purposes, and for meal service.

A passenger seat is typically designed to prevent a backrest from moving beyond its respective TTOL upright position under normal circumstances. However, provision must also be made for the abnormal situation where severe G-force loads may propel a passenger forward toward the backrest directly in front of them. In such cases, the backrest must be allowed to move forward, termed "breakover," toward the seat bottom in a controlled manner to minimize or reduce injury to a passenger who may be thrown against the backrest during an emergency deceleration or impact event. Regulatory requirements for aircraft components in the U.S. specify that seat structures must give passengers a reasonable chance of escaping serious injury in a minor crash-landing situation. For passenger seats, where head contact with seats or other structures may occur, some type of protection must be provided so that the so-called "Head Injury Criterion" (HIC) does not exceed predetermined thresholds. The movement of the backrest in coordination of a passenger impact may beneficially dissipate energy and thus improve HIC related performance, as well as protect the sear from damage.

Backrest recline under normal use conditions is typically controlled by a push button actuator mechanism located in the armrest or elsewhere for actuating a remote recline lock device to permit the backrest to be repositioned from an upright position to a reclined position. Aircraft passenger seats are also commonly equipped with positionable aft tray tables for use by passengers in rearwardly adjacent seats. A tray table is not expected to raise and lower as a backrest is reclined and uprighted. Thus, many performance requirements or expectations are desired in the mounting arrangements of backrests and tray tables.

Improved backrest mounting mechanisms are needed to facilitate multiple functions, including recline control, breakover features, and positionable tray table mounting.

SUMMARY OF THE INVENTIVE ASPECTS

To achieve the foregoing and other advantages, the inventive aspects disclosed herein are directed to a seat recline mechanism, including, a first shaft attachable to a first seat assembly component, the first shaft having a slotted ring defining capture slots and an interior annular space, a control ring having a first end disposed in the annular space, a second shaft attachable to a second seat assembly component, the second shaft engaged with a second end of the control ring, a first collar rotatably disposed around the slotted ring, the first collar having a plurality of release recesses, and a plurality of first bearings respectively retained within the capture slots beneath the first collar. In a first rotational position of the first collar, the plurality of release recesses align with the capture slots to rotationally disengage the first and second components, and in a second rotational position of the first collar, the plurality of release recesses misalign with the capture slots to rotationally engage the first and second seat assembly components.

In some embodiments, in the first rotational position of the first collar, the first bearings are partially offset from the capture slots toward the control ring; and, in the second rotational position of the first collar, the first bearings can partially offset from the capture slots toward the first collar.

In some embodiments, the first shaft comprises a central shaft, the interior annular space defined between the central shaft and the slotted ring.

In some embodiments, the central shaft has a longitudinal end that extends beyond the slotted ring and is received by the inner shaft.

In some embodiments, a second collar is rotatably disposed around an end of the second shaft. In a first rotational position of the second collar, the second shaft is non-rotationally engaged with the second end of the control ring; and in a second rotational position of the second collar, the second shaft is rotationally disengaged from the second end of the control ring.

In some embodiments, multiple second bearings are respectively retained within capture holes in the end of the second shaft beneath the second collar. In the first rotational position of the second collar, the second bearings are partially offset from the capture holes toward the control ring; and, in the second rotational position of the second collar, the second bearings can partially offset from the capture holes toward the second collar.

In some embodiments, a manual control device engages the first collar and is operable to move the first collar between first rotational position and second rotational position thereof; and an automatic release device engages the second collar and is operable to move the second collar between first rotational position and second rotational position thereof.

In some embodiments, the automatic release device includes an inertial mass on a trigger arm movable by inertial forces to move the second collar to the second rotational position.

In some embodiments, a support arm, attachable to a first seat assembly component, is pivotally mounted on the second shaft.

In some embodiments, the control ring has helical grooves in which the first bearings are movable against the forces of springs, when the first collar is in the first rotational position, by a force to overcome the springs thereby permitting the second seat assembly component to rotate relative to the first seat assembly component.

In another aspect, the inventive concepts disclosed herein are directed to a passenger seat assembly including a frame member, a backrest, and a seat recline mechanism. The seat recline mechanism includes a first shaft attached to the frame member, the first shaft having a slotted ring defining capture slots and an interior annular space, a control ring having a first end disposed in the annular space, a second shaft attached to the backrest, the second shaft engaged with a second end of the control ring, a first collar rotatably disposed around the slotted ring, the first collar having a plurality of release recesses, and a plurality of first bearings respectively retained within the capture slots beneath the first collar. In a first rotational position of the first collar, the plurality of release recesses align with the capture slots to rotationally disengage the frame member and backrest. In a second rotational position of the first collar, the plurality of release recesses misalign with the capture slots to rotationally engage the frame member and backrest.

In some embodiments, in the first rotational position of the first collar, the first bearings are partially offset from the capture slots toward the control ring; and, in the second rotational position of the first collar, the first bearings can partially offset from the capture slots toward the first collar.

In some embodiments, the first shaft includes a central shaft, the interior annular space defined between the central shaft and the slotted ring.

In some embodiments, the central shaft has a longitudinal end that extends beyond the slotted ring and is received by the inner shaft.

In some embodiments, a second collar is rotatably disposed around an end of the second shaft. In a first rotational position of the second collar, the second shaft is non-rotationally engaged with the second end of the control ring. In a second rotational position of the second collar, the second shaft is rotationally disengaged from the second end of the control ring.

In some embodiments, multiple second bearings are respectively retained within capture holes in the end of the second shaft beneath the second collar. In the first rotational position of the second collar, the second bearings are partially offset from the capture holes toward the control ring; and, in the second rotational position of the second collar, the second bearings can partially offset from the capture holes toward the second collar.

In some embodiments, a manual control device engages the first collar and is operable to move the first collar between first rotational position and second rotational position thereof; and an automatic release device engages the second collar and is operable to move the second collar between first rotational position and second rotational position thereof.

In some embodiments, the automatic release device includes an inertial mass on a trigger arm movable by inertial forces to move the second collar to the second rotational position.

In some embodiments, a table support arm, attachable to a table, is pivotally mounted on the second shaft.

In some embodiments, the control ring has helical grooves in which the first bearings are movable against the forces of springs, when the first collar is in the first rotational position, by an uprighting force to overcome the springs thereby permitting the backrest to rotate relative to the frame member to an upright position.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The inventive concepts are described hereinafter with reference to the accompanying drawings in which exemplary embodiments are shown. However, the inventive concepts may be embodied in many different forms and should not be construed as limited to the representative embodiments set forth herein.

Figure 1:
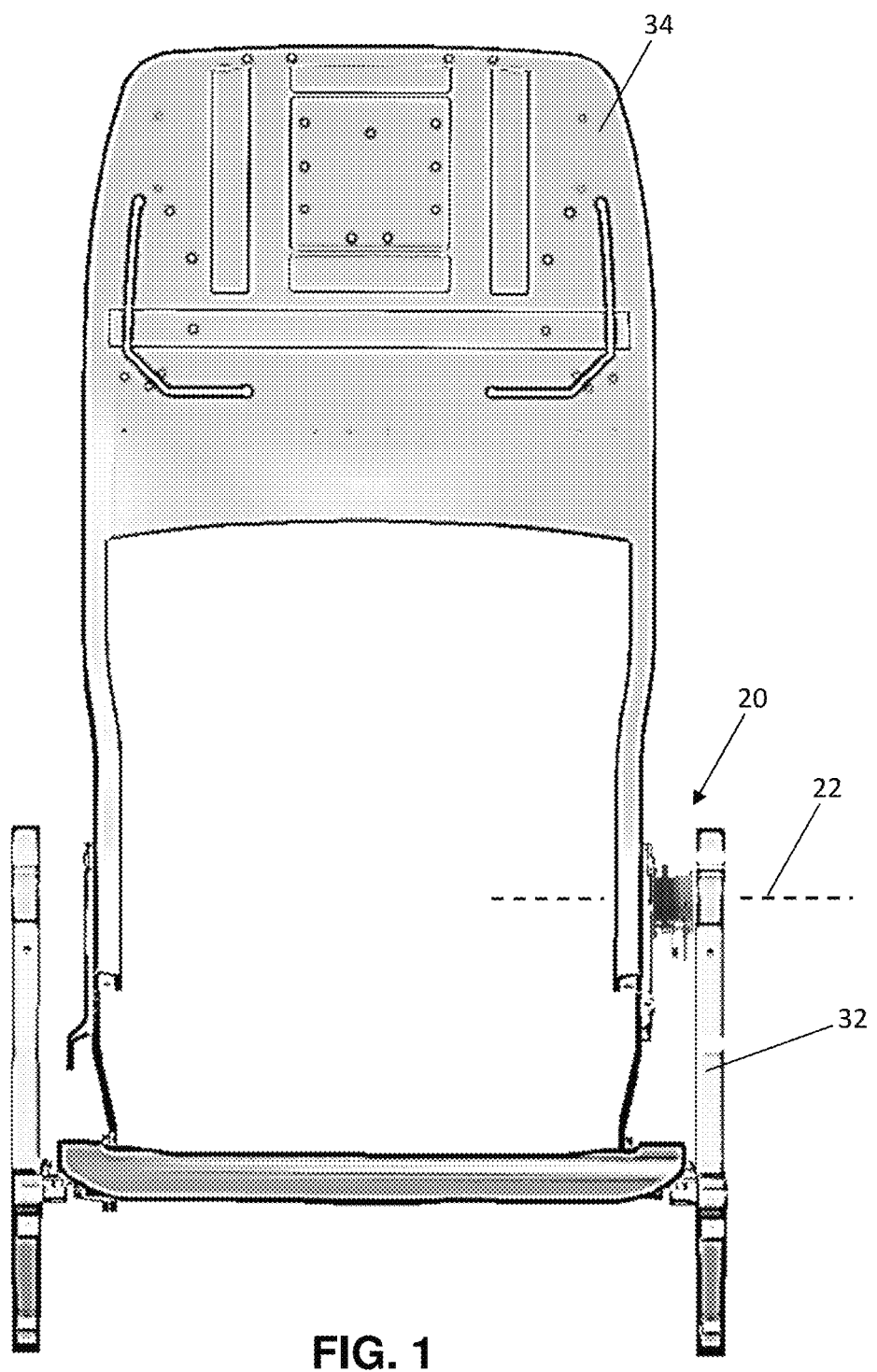
FIG. 1 is a front elevation view of a passenger seat assembly including a multi-functional rotary lock mechanism according to the present disclosure.

A multi-functional rotary lock mechanism according to the present disclosure can be used as a seat recline mechanism for an aircraft passenger seat assembly as shown in FIG. 1. The rotary lock mechanism is illustrated as mounted between a first seat assembly component, referenced as the stationary frame member 32, and a second seat assembly component, referenced as the pivoting backrest 34. The backrest 34 of the seat assembly is pivotable about a horizontal pivot axis under control of the rotary lock mechanism by several modes.

Under manual control, for example by a passenger, the rotary lock mechanism permits the backrest 34 be manually reclined. Upon use of a manually actuated recline control device, a user can adjust the recline angle of the backrest 34 to an upright position, a partial reclined position, and a maximum reclined position. A manual override feature permits the recline setting to be overcome by force imparted on the backrest 34, for example by a passing attendant, to return the backrest 34 to the upright position, for example for taxi-take-off, and landing operations. The manual override feature also serves as a breakover feature in the event of an aft-seated passenger impacting a backrest. By permitting a reclined backrest to return to upright under force, injury to an aft-seated passenger may be avoided or at least reduced by energy dissipation as the backrest returns toward upright.

A further breakover features facilitates an automatic inertial release to permit the backrest to pivot forward under such emergency circumstances such as rapid aircraft decelerations and impacts. The further breakover feature is intended to normally prevent the backrest 34 from pivoting forward past an upright position toward the seat pan, while allowing this movement if sufficient inertial forces due to deceleration or impact occur. The automatic inertial release feature is activated by inertial forces upon the passenger seat assembly, which may precede an aft-seated passenger imparting forces upon a backrest. Thus, by this feature, the backrest may be released to pivot forward as or before a passenger strikes the backrest from behind.

Conveniently, the rotary mechanism also supports a tray table by way of rotatably engaging a table support arm. Thus, multiple functions for use in a passenger seat assembly are facilitated by the multi-functional rotary lock mechanism when mounted between the pivoting backrest 34 and stationary frame member 32 of an aircraft passenger seat assembly as shown in FIG. 1.

Figure 2:
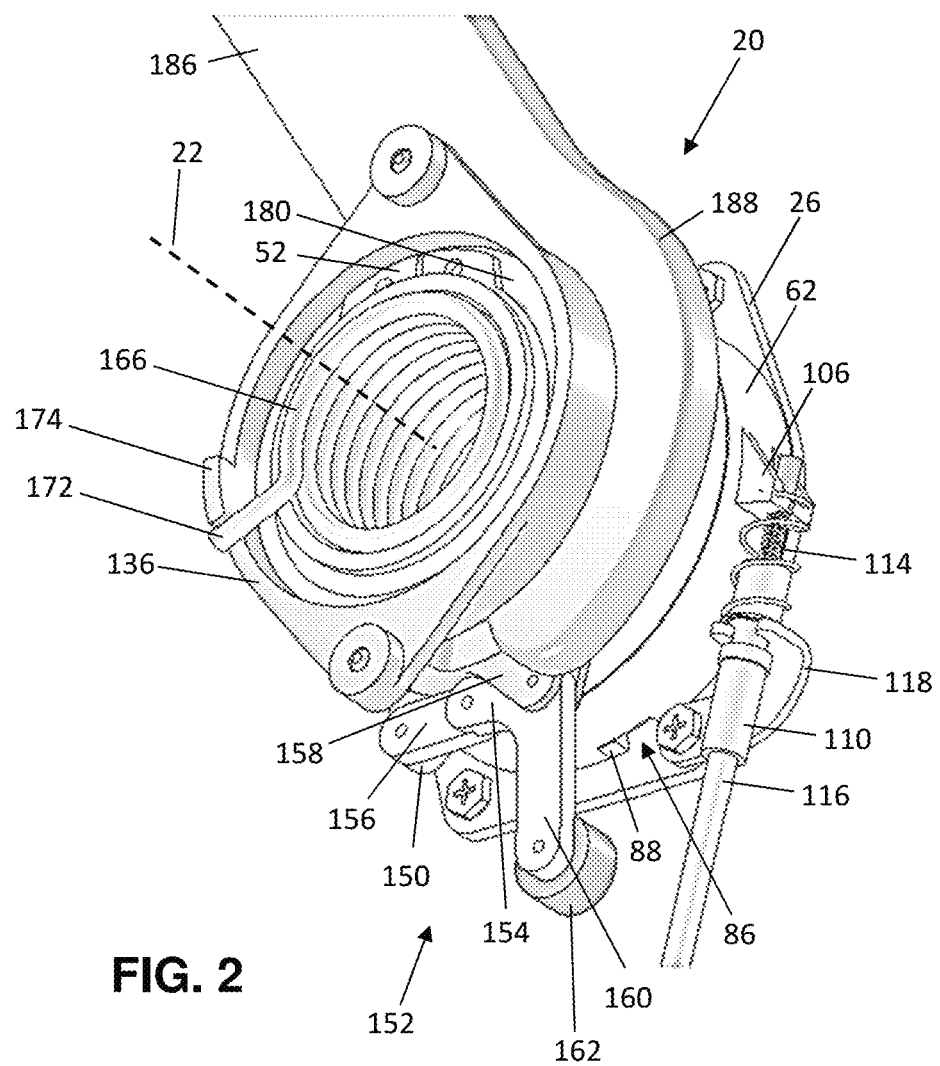
FIG. 2 is a perspective view of a rotary lock mechanism according to the present disclosure.
Figure 3:
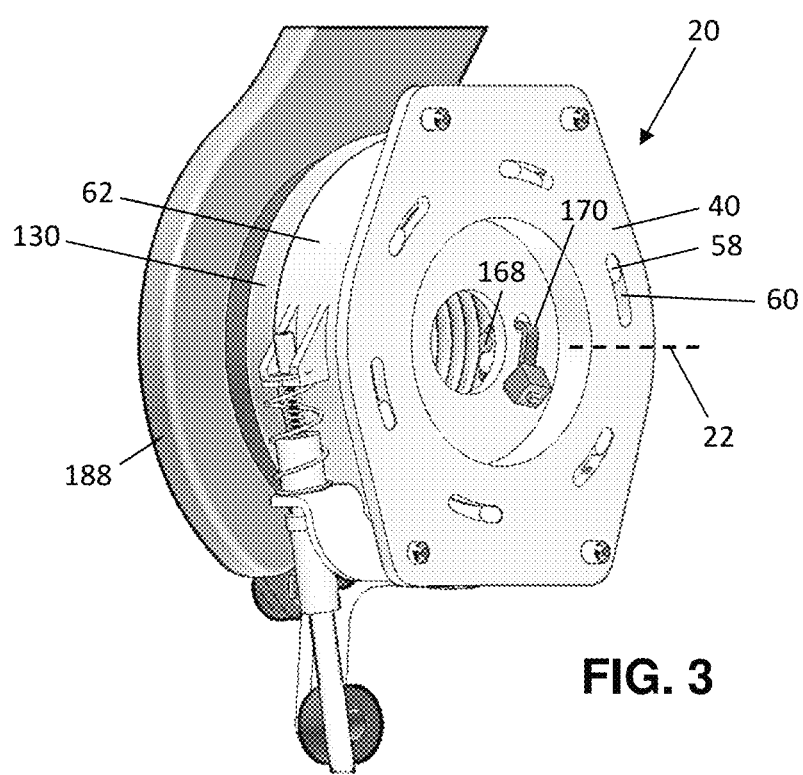
FIG. 3 is another perspective view of the rotary lock mechanism of FIG. 2.

Referring to FIGS. 2-3, a non-limiting example of a multi-functional rotary lock mechanism is shown generally at reference numeral 20. As shown in the exploded perspective view of FIG. 4, some components of the components of the rotary lock mechanism are aligned along a pivot axis 22, which defines a rotational axis around which relative movement occurs in a pivoting joint facilitated by the rotary lock mechanism 20. While each component of the friction mechanism 20 could be described as having a separate axis, the pivot axis 22 is referenced in several of the other drawings for convenience, with the understanding that the respective axes of the components of the friction mechanism are aligned upon assembly. Thus, the pivot axis 22 serves as a reference line in these descriptions. The pivot axis 22 is shown as a cross in views taken along the axis.

Figure 4:
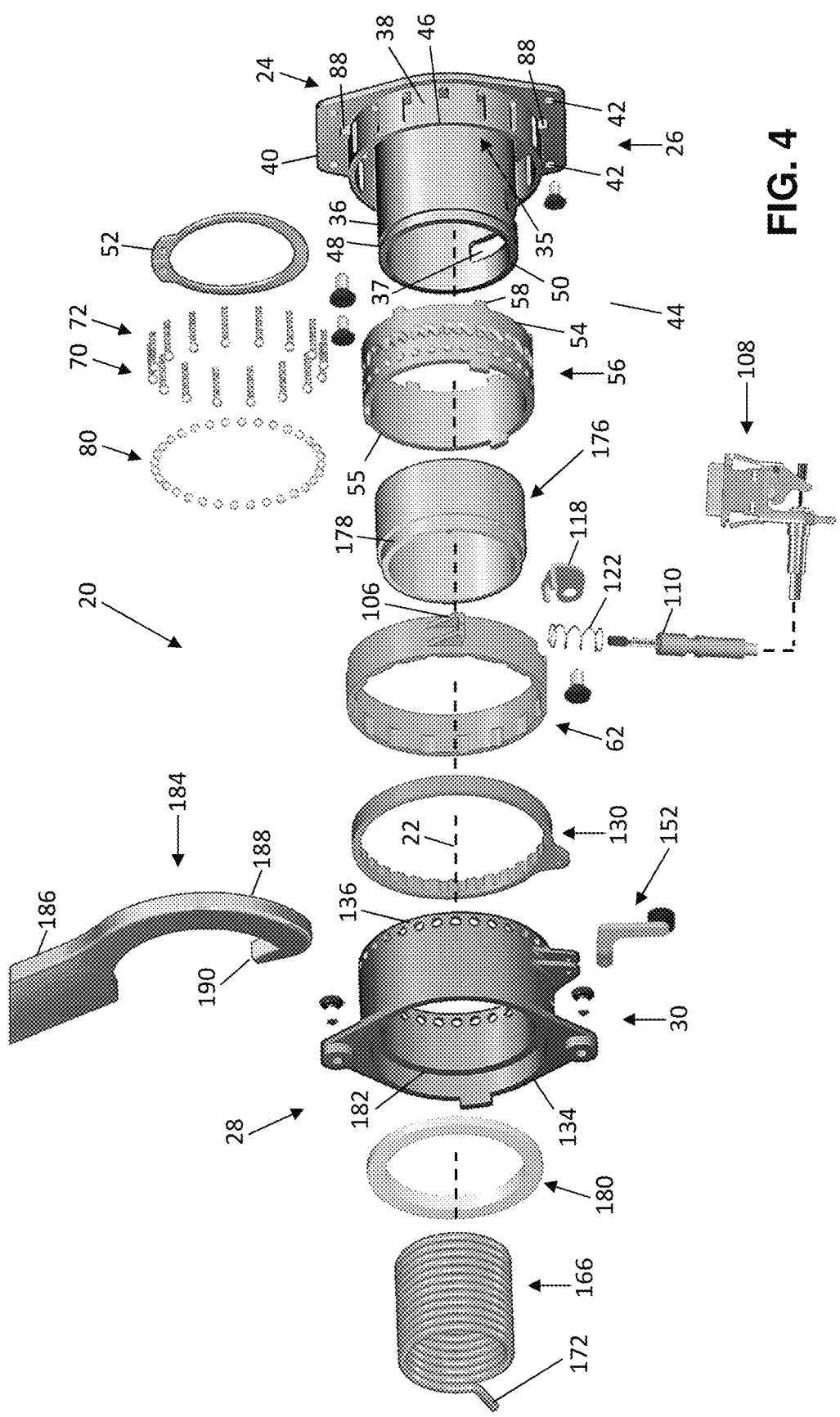
FIG. 4 is an exploded perspective view of the rotary lock mechanism of FIG. 3.

Terms such as radially outward refer to features directed away from the pivot axis 22. Terms such as circumferential refer to features spaced or extended around the pivot axis 22. Terms such as longitudinal refer to features extending along or parallel to the pivot axis 22. Some components that are aligned along the pivot axis in the assembled mechanism are shown in FIG. 4 as offset for illustrative purpose to show their approximate longitudinal positions relative to other parts with which they are associated or on which they are mounted.

A first shaft at a first longitudinal end 24 of the rotary lock mechanism 20 is referenced as an outer shaft 26. A second shaft at a second longitudinal end 28 of the rotary lock mechanism 20 is referenced as an inner shaft 30. In use, the rotary lock mechanism 20 is to be connected at the opposite longitudinal ends to respective structures between which relative pivotal motion is to be controllably permitted. In the example of FIG. 1, the outer shaft 26 is connected to the stationary frame member 32 and the inner shaft 30 is connected to the pivoting backrest 34. The outer shaft 26 includes a longitudinally extending cylindrical central shaft 36 concentrically surrounded by a slotted ring 38, both of which are connected to a base plate 40 that is generally planar and perpendicular to the pivot axis 22. The base plate 40 has mounting holes 42 by which the outer shaft 26 can be non-rotationally attached to a fixed structure, such as the frame member 32 of FIG. 1, using fasteners, such as the bolts 44 as illustrated. An interior annular space 35 is defined between the central shaft 36 a slotted ring 38. The slotted ring concentrically surrounds the central shaft 36 from the base plate 40 to the longitudinal end 46 of the slotted ring 38 opposite the base plate 40. The central shaft 36 extends longitudinally beyond the slotted ring 38 to engage certain other components of the rotary lock mechanism 20. A circumferential locking groove 48 defined near the longitudinal end 50 of the central shaft 36 receives a lock ring 52 in the assembled mechanism to retain certain components on the central shaft 36.

In keeping with the example of FIG. 1, in which the outer shaft 26 is connected to the stationary frame member 32, the outer shaft serves as a fixed frame of reference in these descriptions, whereas the inner shaft 30 is controllably permitted to partially rotate relative to the outer shaft 26. A first longitudinal end 54 of a control ring 56 is received in the annular space 35 of the outer shaft between the central shaft 36 and slotted ring 38. The control ring 56 abuts the base plate 40 within the annular space 35. First-end tabs 58 (FIGS. 3-5) that extend from the first end of the control ring 56 are received by respective circumferentially arcuate slots 60 (FIGS. 3,5) in the base plate 40. The arcuate lengths of the slots 60 relative to smaller circumferential dimensions of the first-end tabs 58 permit the control ring 56 to pivot relative to the outer shaft 26 within a limited recline range corresponding to the range of recline available to the backrest 34 in the example of FIG. 1.

As briefly described above, the rotary lock mechanism 20 has both manually controlled recline and override features, by which the recline position of a backrest 34 can be adjusted, and an automatic release feature, which permits the backrest to pivot forward under such emergency circumstances. The manual recline and override features are described before the automatic release feature in the following.

Under manual control, the control ring 56 is non-rotationally engaged with the inner shaft 30, and partial rotations of the control ring 56 relative to the outer shaft 26 correspond to adjustment of the recline angle of the backrest 34. Rotation of the inner shaft 30 relative to the outer shaft 26 is selectively controlled by use of a first collar, referenced as the manual recline collar 62. Partial rotations of the manual recline collar 62 (FIG. 4) lock and unlock the control ring 56 for partial rotation relative to the outer shaft 26 within the recline range.

Figure 5:
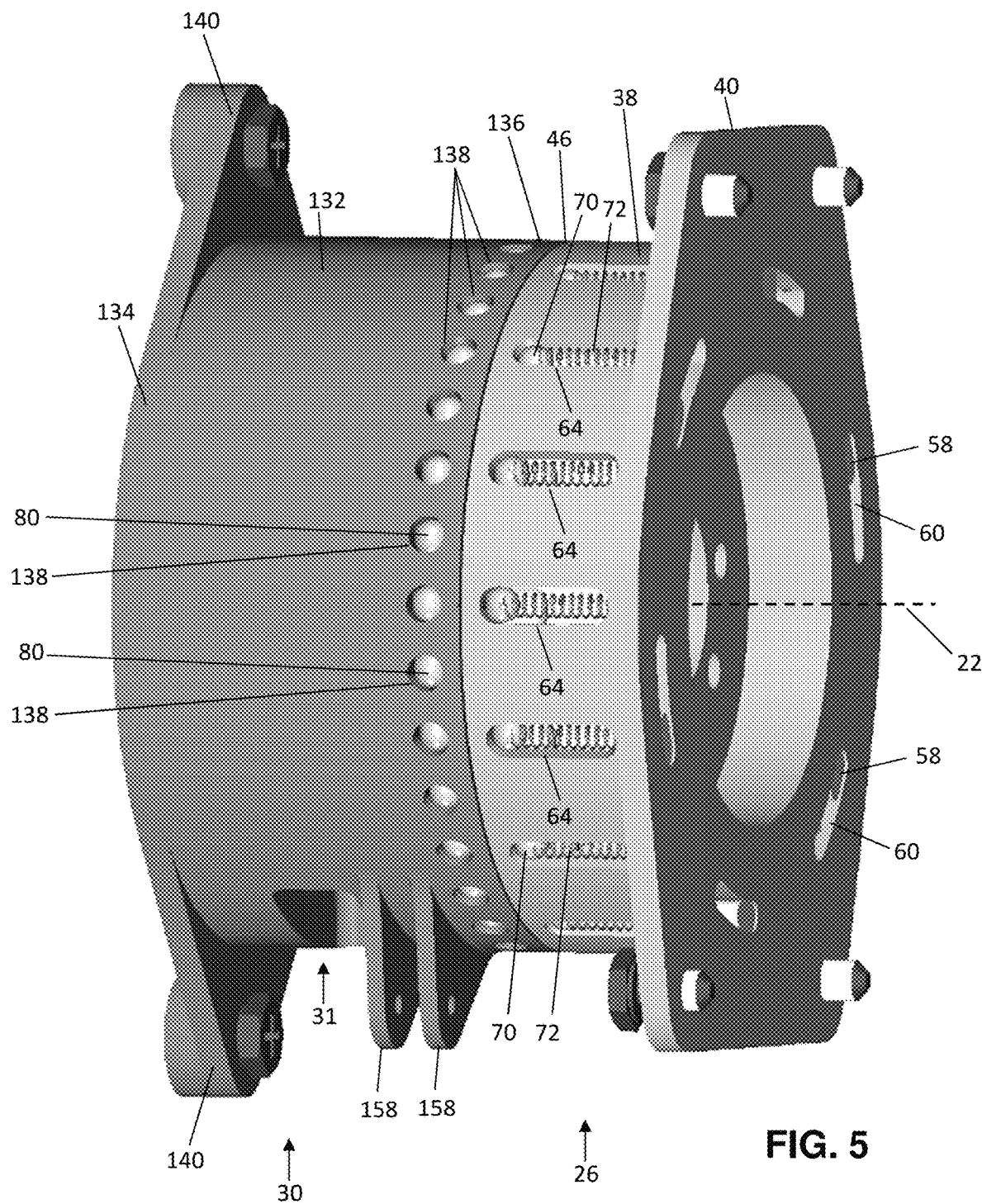
FIG. 5 is a perspective view of the inner shaft and outer shaft of the rotary lock mechanism shown in partial assembly of the rotary lock mechanism.

As shown in FIG. 5, linear and longitudinally extending recline-bearing capture slots 64 are uniformly spaced circumferentially around the control ring 56. Each capture slot 64 is closed at its first end directed toward the base plate 40 and at its second end directed toward the longitudinal end 46 of the slotted ring 38. Each capture slot 64 is defined through the slotted ring 38, permitting a respective first bearing, referenced as a recline bearing 70, within each slot 64 to partially offset radially inward from the slot toward the control ring 56 or partially offset radially outward from the slot toward the manual recline collar 62. The recline bearings 70 are dimensioned to remain partially within the capture slots in either partially offset position. The recline bearings 70 are shown as ball bearings in the illustrated example.

Each recline bearing 70 is captured radially beneath the manual recline collar 62 within a respective capture slot 64 with a respective linear bias spring 72 that persistently presses the recline bearing 70 toward the second end of the slot. With the recline bearings 70 maintained at the second end of the capture slots 64, the rotational position of the manual recline collar 62 determines whether the control ring 56 can rotate relative to the slotted ring 38 according to whether the recline bearings 70 are pressed inward to engage the control ring 56 or permitted to offset outward to disengage the control ring 56. These features relate to manual recline control, with reference to the pivoting backrest 34 of FIG. 1.

Figure 6:
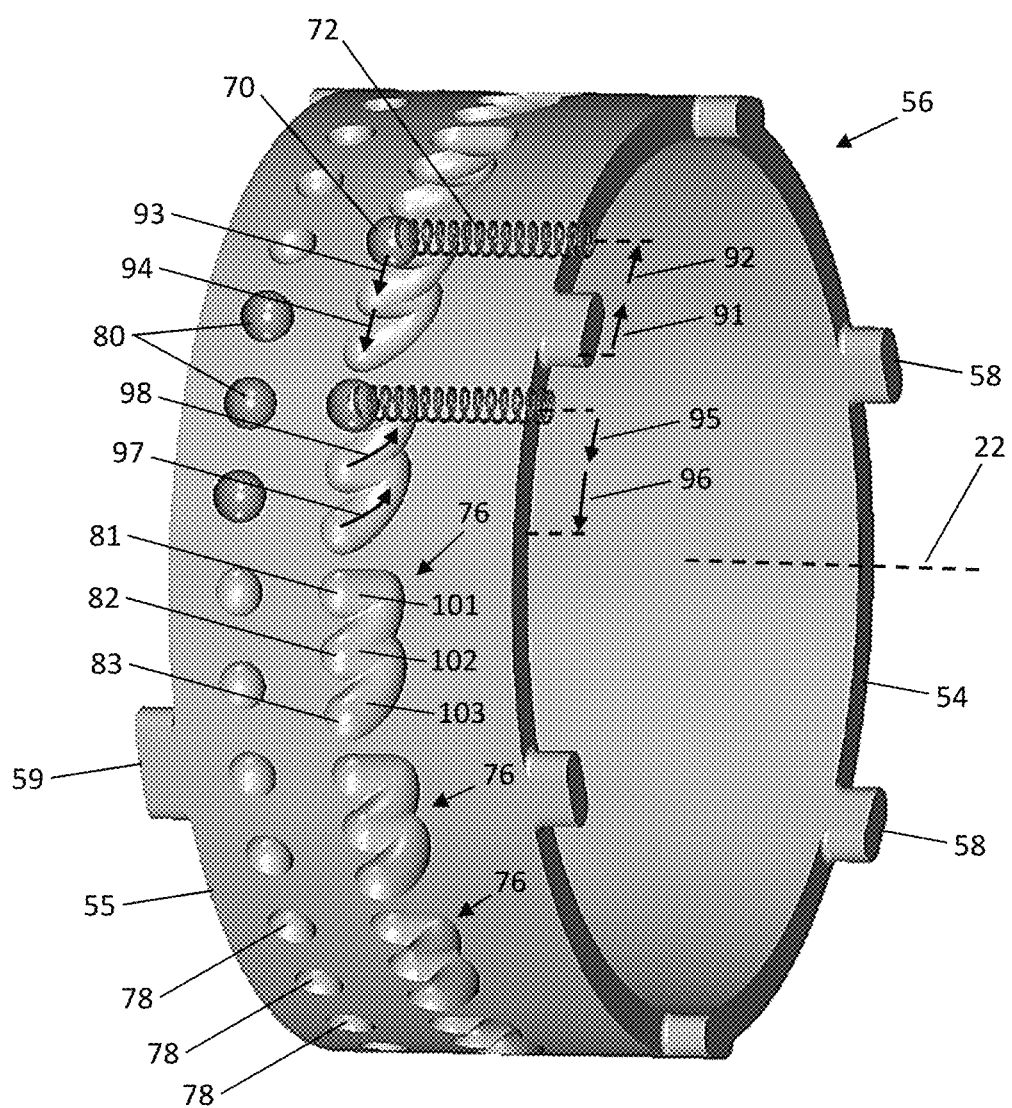
FIG. 6 is a perspective view of the control ring of the rotary lock mechanism showing several separately purposed bearings for illustration of their respective functions.

FIG. 6 shows several recline bearings 70 engaged with the control ring 56 without the outer ring for illustration purposes. The control ring 56 has recline control grooves 76 in one-to-one correspondence with the recline bearings 70 and the capture slots 64 of the slotted ring 38. The recline control grooves 76 are uniformly spaced circumferentially around the exterior of the control ring 56. Each recline control groove 76 has multiple index positions for receiving the respective recline bearing 70 and corresponding to indexed pivotal positions of the control ring 56 relative to the outer shaft 26. In the illustrated example, each recline control groove 76 has a first index position 81, a second index position 82, and a third index position 83, corresponding respectively to increasingly rotated positions of the control ring 56 relative to the outer shaft 26. In the example of FIG. 1, the index positions 81-83 correspond respectively to the upright position, the partial reclined position, and the maximum reclined position, of the backrest 34 relative to the frame member 32 of the seat assembly.

Figure 7:
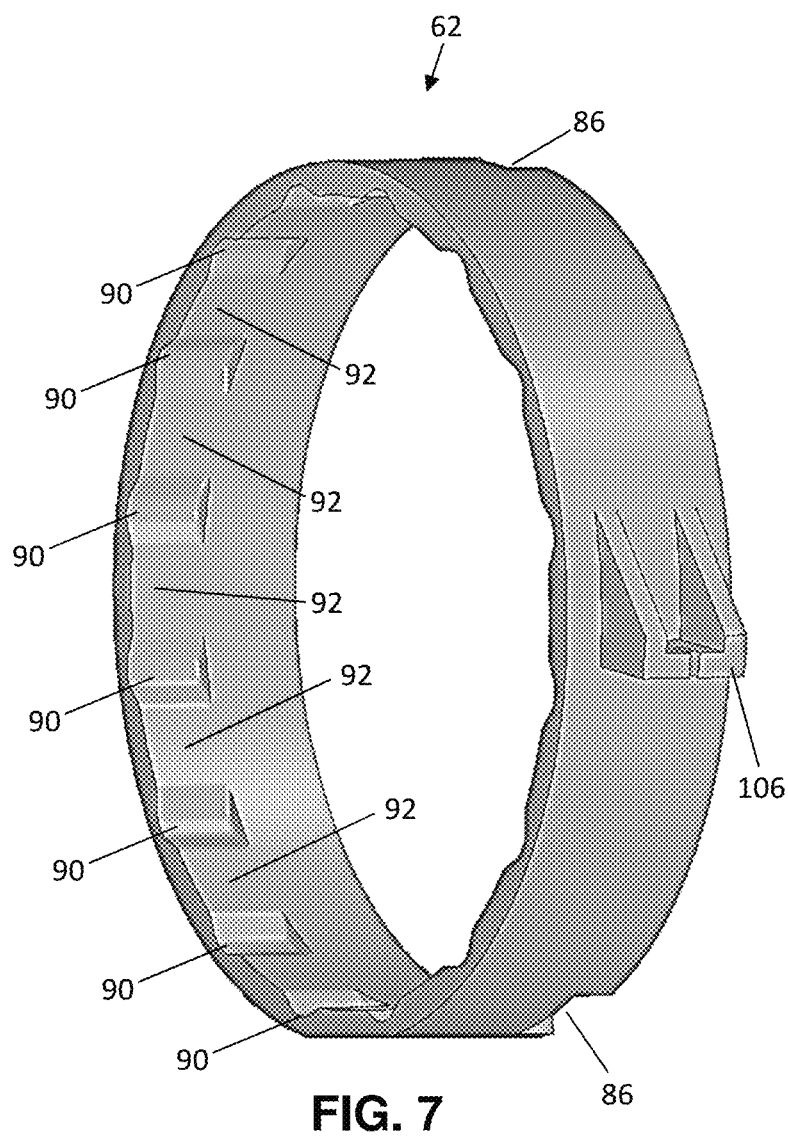
FIG. 7 is an enlarged perspective view of the manual recline collar of the rotary lock mechanism.

In the assembled rotary lock mechanism 20, (FIG. 3), the manual recline collar 62 abuts the base plate 40 of the outer shaft 26 and surrounds the slotted ring 38. As shown in FIG. 7, the manual recline collar 62 has a first end for abutting the base plate 40. The first end of the manual recline collar 62 has pivot limit gaps 86, each of which receives a respective stop tab 88 that extends from the base plate 40 (FIG. 2,4). The manual recline collar 62 is pivotal around the slotted ring 38 in a rotational range defined by engagement of the stop tabs 88 with opposing circumferential ends of the pivot limit gaps 86. The manual recline collar 62 can be pivoted between a recline-locked position and a recline-unlocked position.

Figure 8:
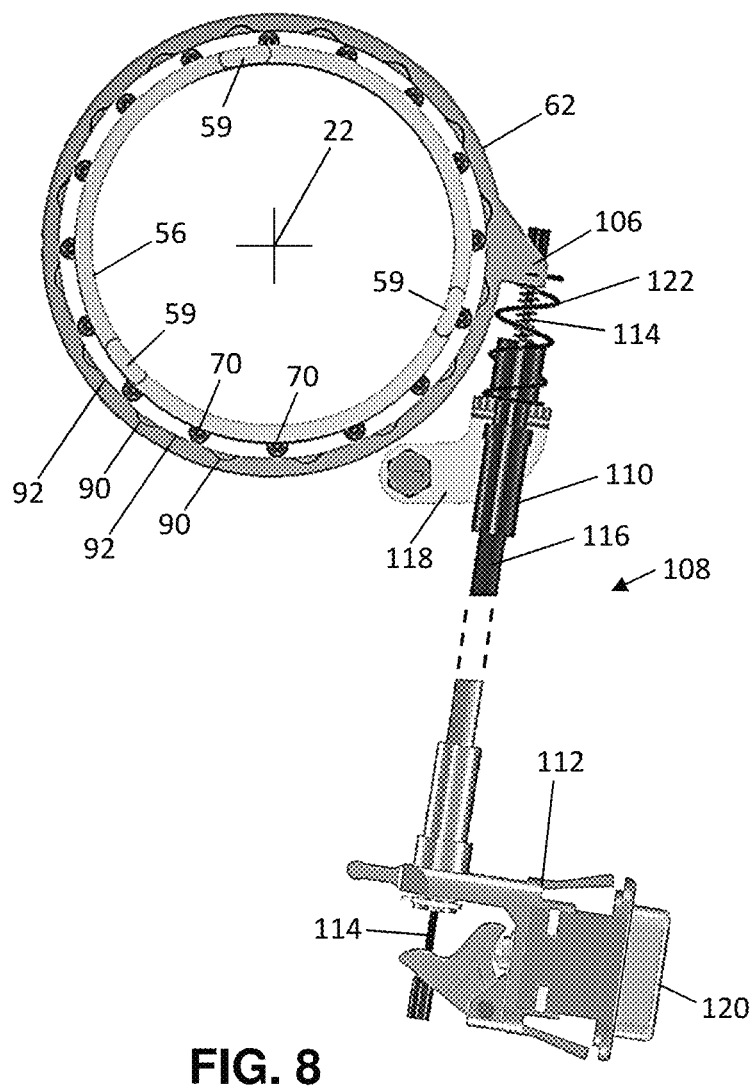
FIG. 8 is a side view of several components of the rotary lock mechanism shown for illustration of manual recline features.

The second end of the manual recline collar 62 has recline recesses 90 in one-to-one correspondence with the recline bearings 70 and the capture slots 64 of the slotted ring 38 of the outer shaft 26. The recline recesses 90 are uniformly spaced circumferentially around the interior of the manual recline collar 62 and are separated by radially inward facing lock surfaces 92 that engage the recline bearings 70 when the manual recline collar 62 is in a first rotational position, termed as the recline-locking position, as shown in FIG. 8. The recline recesses 90 have ramped edges leading to the lock surfaces 92 to facilitate smooth transition of the recline bearings.

FIG. 8 shows the control ring 56, recline bearings 70, and manual recline collar 62 without the outer shaft 26. In the assembled rotary lock mechanism 20, the slotted ring 38 of the outer shaft is radially positioned between the control ring 56 and the manual recline collar 62, with the capture slots 64 retaining the recline bearings 70. In the recline-locked position of the manual recline collar 62 shown in FIG. 8, the lock surfaces 92 align with the capture slots 64 of the slotted ring 38 and press the recline bearings 70 inward, which are thereby offset radially inward and engage the recline control grooves 76 of the control ring 56. As long as the recline bearings 70 are maintained as offset inward by the manual recline collar 62, and at the second ends of the capture slots 64 by the linear bias springs 72, each recline bearing 70 engages a respective recline control groove 76 at the first index position 81, second index position 82, or third index position 83.

In a second rotational position of the manual recline collar 62, termed as the recline-unlocked position, the recline recesses 90 align with the capture slots 64 of the slotted ring 38, thus permitting the recline bearings 70 to offset radially outward into the recline recesses 90 and escape the recline control grooves 76 of the control ring 56. This disengages the recline bearings 70 from the control ring 56 and permits the control ring 56 to rotate relative to the outer shaft 26 within the recline range. As the control ring 56 rotates, the index positions of control grooves of the control ring 56 align selectively with the reline bearings. For example, starting in the upright position of the backrest 34, the first index positions 81 of the control grooves 76 align with the recline bearings 70. Upon rotation of the control ring 56 by a first reclining increment 91 (FIG. 6), the second index positions 82 align with the recline bearings 70 and the backrest 34 is moved from the upright position to the partial reclined position. Upon rotation of the control ring 56 by a second reclining increment 92 (FIG. 8), the third index positions 83 align with the recline bearings 70 and the backrest 34 is moved from the partial reclined position to the maximum reclined position. These rotations of the control ring 56 referenced as the first increment 91 and second increment 92 in FIG. 6 are correlated respectively with repositioning of the recline bearings 70 relative to the control ring 56 with a first reclining step 93 from the first index position 81 and a second reclining step 94 to the third index position 83. The backrest 34 can be returned from the maximum reclined position to the partial reclined position or upright position by reversing the movements of the control ring 56 as long as the manual recline collar 62 is maintained in the recline-unlocked position.

The manual recline collar 62 is biased toward the recline-locked position for stable use. This maintains the backrest 34 in any selected recline or upright position. The adjustment of the backrest 34 may be perceived by a passenger as direct from the upright position to the maximum reclined position without stopping at the partial reclined position. Upon return of the manual recline collar 62 to the recline locked position, the control ring 56 settles into a position in which one of the index positions of the control grooves align with the respective recline control bearings and the backrest 34 locks into its corresponding recline position.

While various other ways of pivoting the manual recline collar 62 are within the scope of these descriptions, a shifting bracket 106 extends radially outward from the illustrated manual recline collar 62 (FIG. 7) for use in pivoting the collar between the recline-locked position and the recline-unlocked position. FIG. 8 shows a particular example of a recline control device 108 engaging the manual recline collar 62 by way of the shifting bracket 106. The recline control device includes a Bowden cable 110 having a first end engaged with the manual recline collar 62 and the outer shaft 26 (FIG. 2), and a second end engaged with a manually actuated levered device 112 (FIG. 6). At the first end of the Bowden cable, a flexible inner cable 114 engages the shifting bracket 106 and an outer cable housing 116 engages a fixed bracket 118 connected to the base plate 40 of the outer shaft 26. At the second end of the Bowden cable 110, the levered device 112 is used to transmit mechanical force to the first end by manual actuation of a button 120 that rocks a lever and moves of the inner cable 114 relative to the cable housing 116. As the inner cable 114 is pulled relative to the cable housing at the second end of the Bowden cable, the manual recline collar 62 is rotated relative to the outer shaft 26 from the recline-locked position to the recline-unlocked position. The manual recline collar 62 is biased toward the recline-locked position by a spring 122 surrounding the inner cable 114 between the shifting bracket 106 and fixed bracket 118, maintaining the backrest 34 in any selected recline or upright position.

As described above, with the recline bearings 70 maintained at the second ends of the capture slots 64, the manually controlled rotational position of the manual recline collar 62 determines whether the control ring 56 can rotate relative to the outer shaft 26. However, the linear bias springs 72 that press the recline bearings 70 toward the longitudinal end of the outer shaft can be overcome. This relates to a manual override feature that permits a recline setting to be overcome, by force, to return the backrest 34 to an upright position without use of the recline control device 108.

Each recline control groove 76 (FIG. 6) has groove sections interconnecting the multiple index positions, each of which defines a terminus of its corresponding control groove directed toward the second longitudinal end 55 of the control ring 56. A linear first groove section 101 extends longitudinally and terminates at the first index position 81. A helical second groove section 102 extends longitudinally and circumferentially and terminates at the second index position 82. A helical third groove section 103, in similarity with the helical second groove section 102, extends longitudinally and circumferentially and terminates at the third index position 83. The end of each groove section directed toward the first end 54 of the control ring 56 is joined to each adjacent groove section, permitting the associated recline bearing 70 to travel within the control groove among the index positions, with the longitudinal component of any such travel affecting the length of the linear bias spring 72 that persistently presses the recline bearing 70 toward the index positions. Relative to the slotted ring 38 of the outer shaft 26, each recline bearing 70 can travel linearly, longitudinally in particular, due to the capture of each recline bearing 70 within a respective capture slot 64 (FIG. 5). The travel of the recline bearings 70 within the helical second and third groove sections correspond to pivoting movement of the control ring 56 relative to the outer shaft 26.

The manual override feature, by which a recline setting can be overcome by force imparted, for example, on the backrest 34 in FIG. 1 to return the backrest 34 to an upright position, is facilitated by the helical groove sections and spring-biased recline bearings 70. Starting in the maximum recline position of the backrest 34, the third index positions 83 (FIG. 6) of the control grooves 76 align with the recline bearings 70. Sufficient torque applied to the control ring 56 by way of sufficient force on the backrest 34 toward the partial reclined position causes the linear springs 72 to be overcome as the control ring 56 is rotated by a first uprighting increment 95 to align the second index positions 82 with the recline bearings 70. With continued or additional force on the backrest 34 toward the upright position, the control ring 56 can be further rotated by a second uprighting increment 96 to align the first index positions 81 with the recline bearings 70.

These manual override adjustments occur with the manual recline collar 62 in the recline-locked position of FIG. 8. The lock surfaces of the manual recline collar 62 align with the capture slots 64 of the slotted ring 38 and press the recline bearings 70 inward, which are thereby offset radially inward and engage the recline control grooves 76 of the control ring 56. The rotations of the control ring 56 referenced as the first uprighting increment 95 and second uprighting increment 96 in FIG. 6 are correlated respectively with repositioning of the recline bearings 70 relative to the control ring 56 by a movement 97 along the helical third groove section 103 and a movement 98 along the helical second groove section 102. The uprighting increments 95 and 96, which are correlated with uprighting of the backrest 34, are in a rotational direction opposite that of the reclining increments 91 and 92, which are correlated with reclining of the backrest 34.

To prompt the uprighting increments, force applied to the backrest 34 is converted to torque about the pivot axis 22, and the torque is converted to linear force upon the recline bearings 70 by the helical groove sections 103 and 102 to overcome the linear bias springs 72. However, the linear first groove 101 section extends longitudinally, and thus rotation beyond the second uprighting increment 96 in FIG. 6 is prevented as the backrest 34 reaches the upright position. Furthermore, the helical second groove section 102 and helical third groove section 103 extend circumferentially in a common direction from the second index position 82 and third index position 83, respectively, to facilitate only one-way conversion of torque to force on the recline bearings 70 and linear bias springs 72. The override feature thus operates to permit uprighting rotation of the control ring 56 relative to the outer shaft 26 in response to uprighting forces on the backrest 34, while preventing rotation in reverse and preventing the backrest 34 from being further reclined from any given recline setting without use of the recline control device 108. Movement beyond the recline range is further prevented by the first-end tabs 58 of the control ring 56 in the respective slots 60 in the base plate 40 of the outer shaft.

The recline control grooves 76 have arcuate walls accommodating the radii of the recline bearings 70 and facilitating the first reclining step 93 and a second reclining step 94 when the manual recline collar 62 is in the recline-unlocked position, and facilitating the override uprighting movements 97 and 98 along the helical groove sections when the manual recline collar 62 is in the recline-locked position.

The manual override feature, by which a recline setting can be overcome by force, permits a backrest to be returned to upright without use of the recline control device 108, whether the force be imparted by a passing airline attendant prepping an occupied or unoccupied seat assembly for use, or whether the force be imparted by an aft-seated passenger impacting the backrest. By permitting a reclined backrest to return to upright under force, the override feature also serves as a breakover feature to prevent or reduce injury to an aft-seated passenger by energy dissipation as the backrest returns toward upright.

Throughout the above described manual reclining and manual override functions of the multi-functional rotary lock mechanism 20, the control ring 56 is considered as non-rotationally engaged with the inner shaft 30. Thus, as the control ring 56 is permitted to partially rotate about the pivot axis 22 relative to the outer shaft 26, the inner shaft 30 rotates with the control ring 56. In the example of FIG. 1, this corresponds to the backrest 34, to which the inner shaft 30 is connected, pivoting relative to the frame member 32 to which the outer shaft 26 is connected. The rotary lock mechanism 20 further has an automatic breakover release feature, which permits the backrest 34 to pivot forward under emergency circumstances despite the position of the control ring 56.

In particular, the position of a second collar, referenced as the automatic release collar 130, determines whether the control ring 56 can rotate relative to the inner shaft 30. A ring of lock notches 78 (FIG. 6) is defined between the ring of recline control grooves 76 and the second end 55 of the control ring 56. The lock notches 78 are uniformly spaced circumferentially around the exterior of the control ring 56 in one-to-one correspondence with second bearings, referenced as automatic release bearings 80. The release bearings 80 are shown as ball bearings in the illustrated example.

The inner shaft 30 has a longitudinally extending cylinder 132 with a first end 134 for attachment to a pivotal structure such as the backrest 34 of FIG. 1 and a second end 136 near which a ring of capture holes 138 is defined. Mounting plates 140, which extend radially outward from the first end 134, have mounting holes by which the inner shaft 30 can be non-rotationally attached to a pivoting structure, such as the pivoting backrest 34 of FIG. 1, using fasteners, such as bolts as illustrated.

The capture holes 138 are uniformly spaced circumferentially in one-to-one correspondence with the automatic release bearings 80 and lock notches 78, which are radially beneath the automatic release collar 130. Each capture hole is defined through the second end 136 of the cylinder 132, permitting a respective release bearing 80 within each capture hole 138 to offset radially inward from the hole toward the control ring 56 or offset radially outward from the hole toward the manual recline collar 62. The release bearings 80 are dimensioned to remain partially within the capture holes 138 in either offset position. The rotational position of the automatic release collar 130 determines whether the control ring 56 can rotate relative to the inner shaft 30 according to whether the release bearings 80 are pressed inward to engage the control ring 56 or permitted to offset outward to disengage from the control ring 56.

Figure 11:
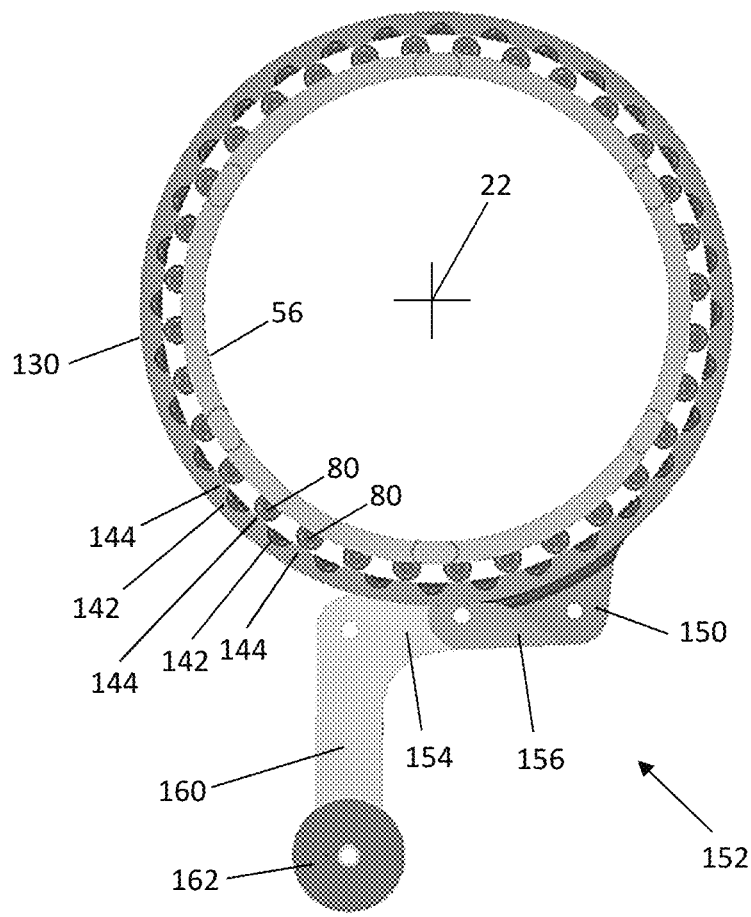
FIG. 11 is a side view of several components of the rotary lock mechanism shown for illustration of locked positions of the automatic release collar and an automatic release device.

In the assembled rotary lock mechanism 20, (FIG. 3), the automatic release collar 130 is positioned longitudinally adjacent the manual recline collar 62. The second end 55 of the control ring 56 (FIG. 6) is received within the second end 136 of the cylinder 132 of the inner shaft 30, which abuts the longitudinal end of the slotted ring 38 of the outer shaft 26 as shown in FIG. 5. The release collar 130 is pivotally mounted on the second end of the cylinder surrounding the capture holes 138. The release collar 130 has release recesses 142 in one-to-one correspondence with the release bearings 80 and the capture holes 138. The release recesses 142 are uniformly spaced circumferentially around the interior of the release collar 130 and are separated by radially inward facing lock surfaces 144 that engage the release bearings 80 when the release collar 130 is in the locked position as shown in FIG. 11. The release recesses 142 have ramped walls leading to the lock surfaces 144 to facilitate transition of the release bearing 80

In the locked position of the automatic release collar 130 (FIG. 11), the lock surfaces align with the capture holes 138 of the inner shaft 30 and press the release bearings 80 inward, which are thereby offset radially inward and engage the lock notches 78 of the control ring 56 (FIG. 6). As long as the release bearings 80 engage the control ring 56, the inner shaft 30 and control ring 56 are non-rotationally engaged.

Figure 12:
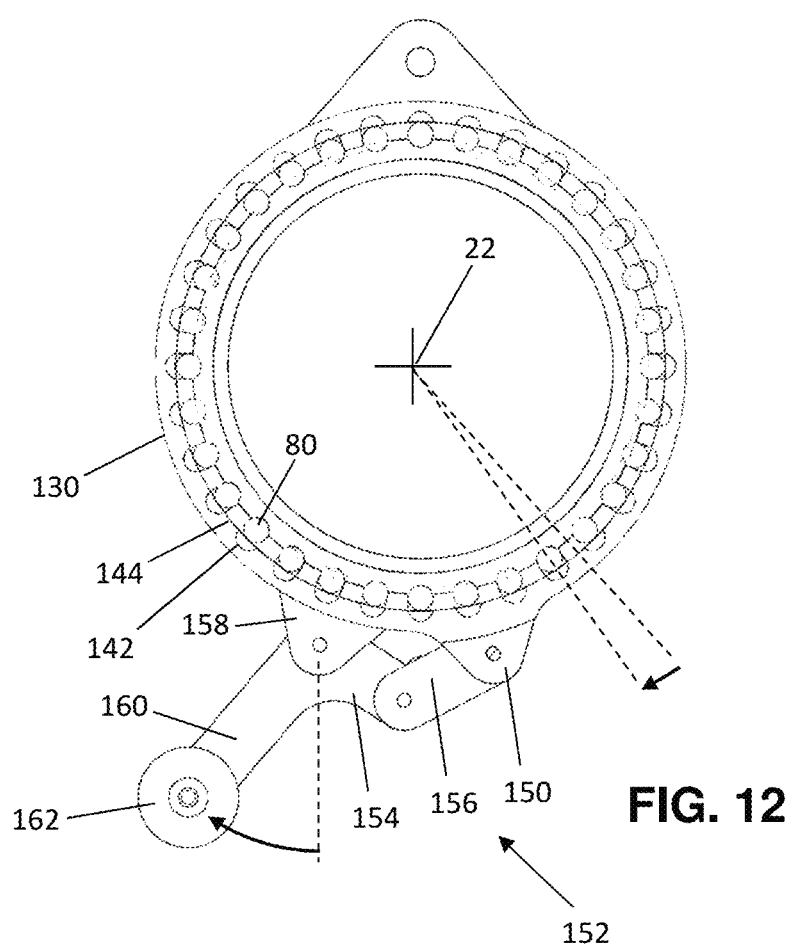
FIG. 12 is a side view of the components of FIG. 11 shown for illustration of release positions of the automatic release collar and automatic release device.

The automatic release collar 130 can be pivoted from the locked position (FIG. 11) to a release position (FIG. 12). In the release position of the release collar 130, the release recesses 142 align with the capture holes 138 of the inner shaft 30, thus permitting the release bearings 80 to offset radially outward into the release recesses 142 and escape the lock notches 78 of the control ring 56. This disengages the release bearings 80 from the control ring 56 and permits the control ring 56 to rotate relative to the inner shaft 30 within a limited release rotation range.

Figure 10:
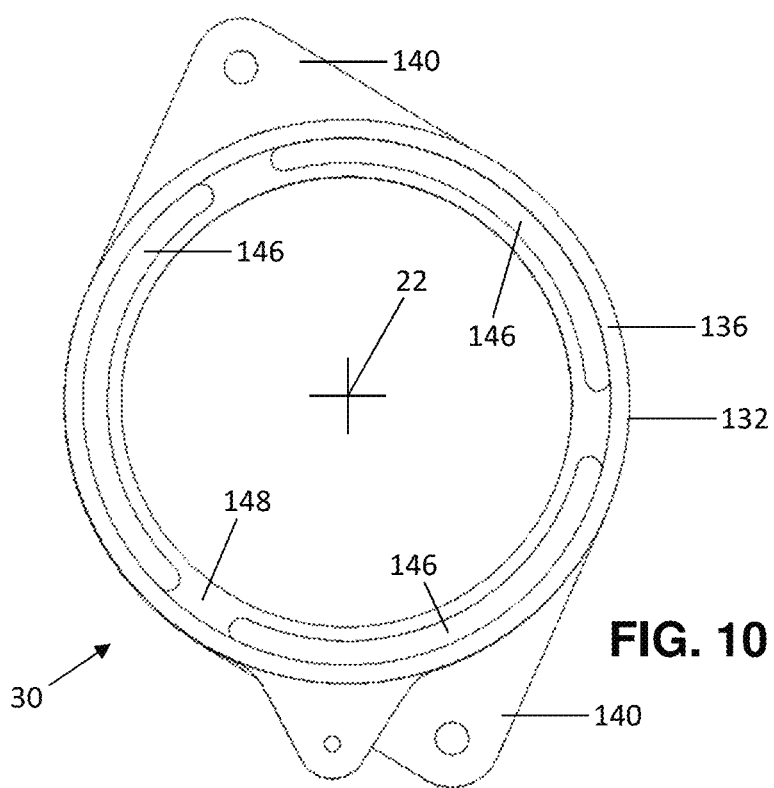
FIG. 10 is an enlarged side view of the inner shaft of the rotary lock mechanism.

Second-end tabs 59 (FIGS. 3-5) that extend longitudinally from the second end 55 of the control ring 56 limit the release rotation range by engaging the inner shaft 30. Each second-end tab 59 is received by a respective arcuate track 146 (FIG. 10) defined in an annular lip 148 within the second end 136 of the inner shaft 30. The arcuate lengths of the tracks 146 relative to the dimensions of the second-end tabs 59 permit the control ring 56 to pivot relative to the inner shaft 30 within the release rotation range corresponding to a pivotal range available to the backrest 34 upon release of the control ring 56 from the inner shaft 30 by the automatic release collar 130. These automatic release features permit the backrest to pivot forward under such emergency circumstances such as rapid aircraft decelerations and impacts, preventing or reducing the likelihood of a passenger striking a backrest 34 from behind with enough force to cause serious injury. In at least one embodiment, the release rotation range predetermined by engagement of the second-end tabs 59 with the tracks 146 permits the backrest 34 to move forward beyond the upright position but stops the backrest from reaching a seat pan of a seat assembly under breakover conditions.

Figure 9:
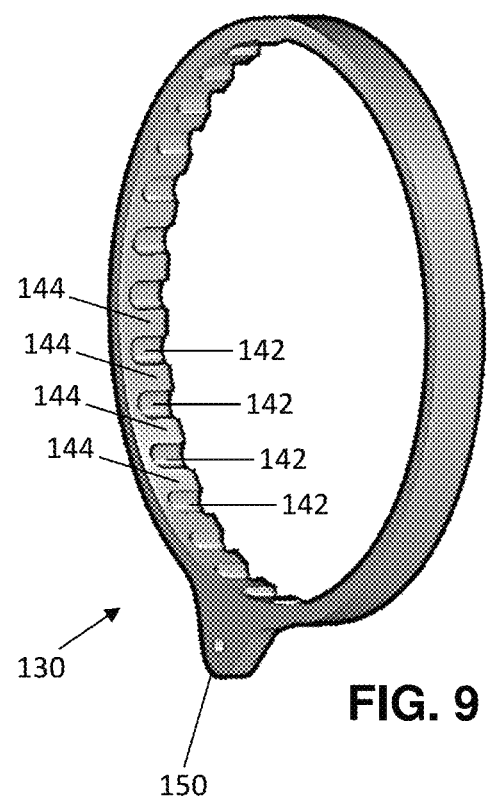
FIG. 9 is an enlarged perspective view of the automatic release collar of the rotary lock mechanism.

While various other ways of pivoting the automatic release collar 130 are within the scope of these descriptions, a shifting tab 150 (FIG. 9) extends radially outward from the automatic release collar 130 for use in pivoting the collar between the locked position (FIG. 11) and the release position (FIG. 12). FIGS. 2 and 11-12 shows a particular example of an automatic release device 152 engaging the release collar 130 by way of the shifting tab 150. The automatic release device 152 includes a first link 154 and a second link 156 that cooperatively position the automatic release collar 130.

A parallel pair of hinge plates 158 extends radially from the exterior of the cylinder of the inner shaft 30. The first link 154 is pivotally mounted at its first end to the inner shaft 30 between the hinge plates 158. A second end of first link 154 is pivotally attached to a first end of the second link 156. A trigger arm 160 extends from the first end of the first link 154. A second end of the second link 156 is pivotally attached to the shifting tab 150 of the automatic release collar 130. When the automatic release collar 130 is in the locked position, the trigger arm 160 extends radially from the first link 154. Movement of the trigger arm 160 causes the first link 154 to draw the first end of the second link 156 radially outward, causing the second link the pull the shifting tab 150 and automatic release collar 130 to the release position. In the illustrated embodiment, an inertial mass 162 is mounted on the trigger arm 160 such that inertial forces can prompt the release of the automatic release collar 130. In particular, the automatic release device 152 causes pivoting of the automatic release collar 130 from the locked position to the release position upon forward movement of the intertial mass 162 relative to the inner shaft 30 under such emergency circumstances such as rapid aircraft decelerations and impacts. This may precede an aft-seated passenger imparting forces upon the backrest. Thus, by this feature, the backrest may be released to pivot forward as or before a passenger strikes the backrest from behind.

The rotary lock mechanism 20 includes a torsion spring 166 that persistently biases the inner shaft 30 relative to the outer shaft 26 to a relative pivotal position corresponding to the upright position of the backrest 34 in the example of FIG. 1. A first end of the torsion spring has a radially inward extending segment 168 (FIG. 3) that non-rotationally engages the outer shaft 26, particularly by use of a cable tie 170 as illustrated in FIG. 3 or other fastener. A second end of the torsion spring 166 has a radially outward extending segment 172 that engages the inner shaft 30 via a stop tab 174 (FIG. 2) that extends longitudinally from the first end 134 of the inner shaft 30. The torsion spring 166 has a helical coil positioned concentrically within the central shaft 36. The torsion spring 166 returns or assists the backrest 34 to its upright position when the manual recline collar 62 permits.

An interior bushing 176 (FIG. 4) has a cylindrical body positioned concentrically between the inner cylindrical wall of the central shaft 36 and the helical coil of the torsion spring 166 to facilitate deformations of the coil and protect the central shaft 36 as the rotary lock mechanism 20 operates. The interior bushing 176 has an annular lip 178 that extends from the cylindrical body and pivotally engages the inner shaft 30 helping maintain alignment of the inner shaft 30 and outer shaft 26.

An assembly bushing 180 maintains the inner shaft 30 in alignment and assembly with the outer shaft 26. An annular lip 182 within the first end 134 of the inner shaft 30 receives and engages the assembly bushing 180. The assembly bushing 180 receives the longitudinal end 50 of the central shaft 36 and helps to maintain alignment of the inner shaft 30 and outer shaft 26 while permitting the inner shaft 30 to pivot as the rotary lock mechanism 20 operates. The circumferential locking groove 48 of the central shaft 36 extends longitudinally beyond the assembly bushing 180 with sufficient tolerance to permit the lock ring 52 to snap into the locking groove 48 in the assembled mechanism (FIG. 2), trapping the assembly bushing 180 and other components therewith on the central shaft 36 while permitting the above-described pivotal movements.

Figure 13:
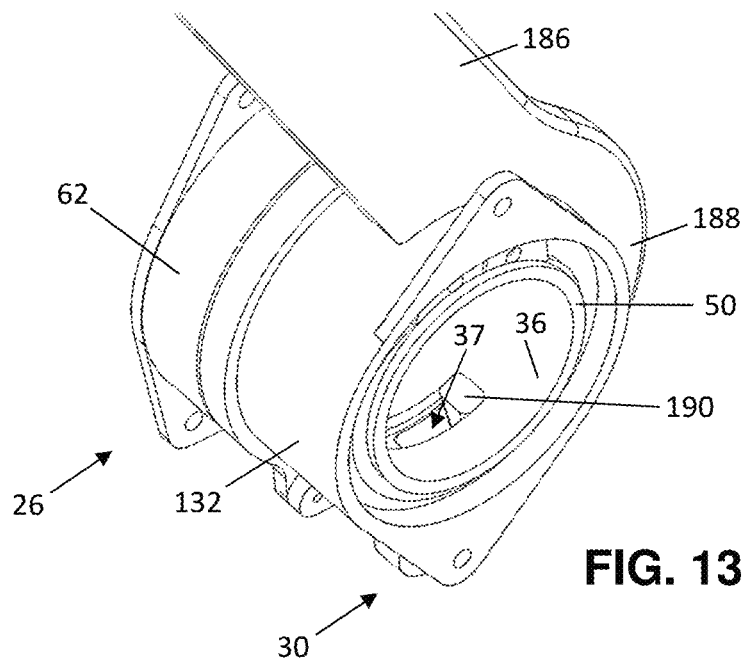
FIG. 13 is a perspective view of several components of the rotary lock mechanism shown for illustration of a first position of a table support arm.
Figure 14:
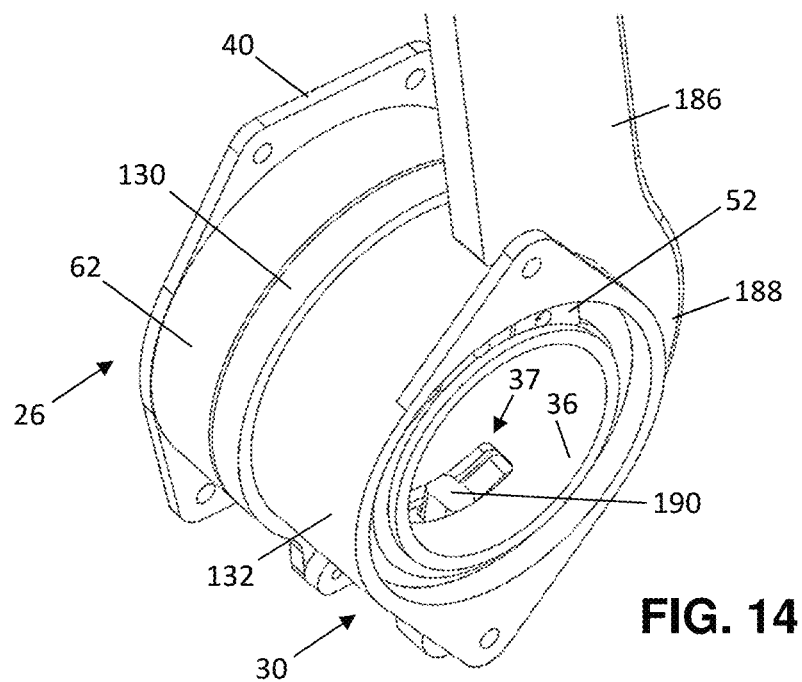
FIG. 14 is a perspective view of several components of the rotary lock mechanism shown for illustration of a second position of the table support arm.

The multi-functional rotary lock mechanism 20 furthermore serves as a pivotal mount for a third seat assembly component, such as a table behind the backrest 34 in the example of FIG. 1. A support arm, referenced as a table support arm 184, is shown in FIG. 13 in a first pivotal position corresponding to deployment of a table behind the backrest 34 in the example of FIG. 1. FIG. 14 shows the table support arm in a second pivotal position corresponding to stowing of a table. As shown in FIG. 4 the arm 184 includes a linear portion 186 that extends radially to support a table. A mounting hook 188 is connected to the linear portion to engage the exterior of the cylinder of the inner shaft 30. An engagement tooth 190 extends radially inward from a terminal end of the mounting hook.

A circumferentially extending first engagement slot 37 (FIG. 13) is defined through the central shaft 36, and a circumferentially extending second engagement slot 31 (FIG. 5) is defined through the cylinder of the inner shaft 30. The first engagement slot 37 is a feature of the outer shaft 26, and so, in the example of FIG. 1, the first engagement slot 37 is stationary with the frame member 32 of the seat assembly. A forward end of the first engagement slot 37 limits the maximum deployment angle of the table support arm. The second engagement slot 31 pivots with the inner shaft 30 as the backrest 34 is reclined and returned toward upright. By engaging the tooth 190 as the table support arm is returned toward upright, a rearward end of the second engagement slot 31 limits the pivotal range available to the table support arm to correspond to the current recline angle of the backrest 34. This feature prevents the table support arm from passing the backrest 34 in their return toward upright.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A seat recline mechanism, comprising:
   a first shaft attachable to a first seat assembly component, the first shaft having a slotted ring defining capture slots and an interior annular space;
   a control ring having a first end disposed in the annular space;
   a second shaft attachable to a second seat assembly component, the second shaft engaged with a second end of the control ring;
   a first collar rotatably disposed around the slotted ring, the first collar having a plurality of release recesses; and
   a plurality of first bearings respectively retained within the capture slots beneath the first collar, wherein:
   in a first rotational position of the first collar, the plurality of release recesses align with the capture slots to rotationally disengage the first and second components; and.
   in a second rotational position of the first collar, the plurality of release recesses misalign with the capture slots to rotationally engage the first and second seat assembly components.

2. The seat recline mechanism of claim 1, wherein, in the first rotational position of the first collar, the first bearings are partially offset from the capture slots toward the control ring; and, in the second rotational position of the first collar, the first bearings can partially offset from the capture slots toward the first collar.

3. The seat recline mechanism of claim 1, wherein the first shaft comprises a central shaft, and the interior annular space is defined between the central shaft and the slotted ring.

4. The seat recline mechanism of claim 3, wherein the central shaft has a longitudinal end that extends beyond the slotted ring and is received by the second shaft.

5. The seat recline mechanism of claim 1, further comprising a second collar rotatably disposed around an end of the second shaft, wherein:
   in a first rotational position of the second collar, the second shaft is non-rotationally engaged with the second end of the control ring; and
   in a second rotational position of the second collar, the second shaft is rotationally disengaged from the second end of the control ring.

6. The seat recline mechanism of claim 5, further comprising a plurality of second bearings respectively retained within capture holes in the end of the second shaft beneath the second collar, wherein, in the first rotational position of the second collar, the second bearings are partially offset from the capture holes toward the control ring; and, in the second rotational position of the second collar, the second bearings can partially offset from the capture holes toward the second collar.

7. The seat recline mechanism of claim 5, further comprising a recline control device engaging the first collar and operable to move the first collar between first rotational position and second rotational position thereof; and an automatic release device engaging the second collar and operable to move the second collar between first rotational position and second rotational position thereof.

8. The seat recline mechanism of claim 7, wherein the automatic release device comprises an inertial mass on a trigger arm movable by inertial forces to move the second collar to the second rotational position.

9. The seat recline mechanism of claim 1, further comprising a support arm attachable to a first seat assembly component, the support arm pivotally mounted on the second shaft.

10. The seat recline mechanism of claim 1, wherein the control ring has helical grooves in which the first bearings are biased by springs, when the first collar is in the first rotational position, by a force to overcome the springs thereby permitting the second seat assembly component to rotate relative to the first seat assembly component.

11. A passenger seat assembly comprising:
a frame member;
a backrest; and
a backrest recline mechanism, including:
a first shaft attached to the frame member, the first shaft having a slotted ring defining capture slots and an interior annular space;
a control ring having a first end disposed in the annular space;
a second shaft attached to the backrest, the second shaft engaged with a second end of the control ring;
a first collar rotatably disposed around the slotted ring, the first collar having a plurality of release recesses; and
a plurality of first bearings respectively retained within the capture slots beneath the first collar,
wherein:
in a first rotational position of the first collar, the plurality of release recesses align with the capture slots to rotationally disengage the frame member and backrest; and
in a second rotational position of the first collar, the plurality of release recesses misalign with the capture slots to rotationally engage the frame member and backrest.

12. The passenger seat assembly of claim 11, wherein, in the first rotational position of the first collar, the first bearings are partially offset from the capture slots toward the control ring; and, in the second rotational position of the first collar, the first bearings can partially offset from the capture slots toward the first collar.

13. The passenger seat assembly of claim 11, wherein the first shaft comprises a central shaft, and the interior annular space is defined between the central shaft and the slotted ring.

14. The passenger seat assembly of claim 13, wherein the central shaft has a longitudinal end that extends beyond the slotted ring and is received by the second shaft.

15. The passenger seat assembly 11, further comprising a second collar rotatably disposed around an end of the second shaft, wherein: in a first rotational position of the second collar, the second shaft is non-rotationally engaged with the second end of the control ring; and in a second rotational position of the second collar, the second shaft is rotationally disengaged from the second end of the control ring.

16. The passenger seat assembly of claim 15, further comprising a plurality of second bearings respectively retained within capture holes in the end of the second shaft beneath the second collar, wherein, in the first rotational position of the second collar, the second bearings are partially offset from the capture holes toward the control ring; and, in the second rotational position of the second collar, the second bearings can partially offset from the capture holes toward the second collar.

17. The passenger seat assembly of claim 15, further comprising a recline control device engaging the first collar and operable to move the first collar between first rotational position and second rotational position thereof; and an automatic release device engaging the second collar and operable to move the second collar between first rotational position and second rotational position thereof.

18. The passenger seat assembly of claim 17, wherein the automatic release device comprises an inertial mass affixed to a trigger arm movable by inertial forces to move the second collar to the second rotational position.

19. The passenger seat assembly of claim 11, further comprising a table support arm attachable to a table, the support arm pivotally mounted on the second shaft.

20. The passenger seat assembly of claim 11, wherein the control ring has helical grooves in which the first bearings are biased by springs, when the first collar is in the first rotational position, by an uprighting force to overcome the springs thereby permitting the backrest to rotate relative to the frame member to an upright position.

* * * * *